United States Patent
Roth et al.

(10) Patent No.: US 6,439,974 B1
(45) Date of Patent: Aug. 27, 2002

(54) WORKPIECE HOLDER FOR A MACHINE TOOL

(75) Inventors: Erwin Roth, Port; Ulrich Muehlematter, Faulensee, both of (CH)

(73) Assignee: Fritz Studer AG (CH)

( * ) Notice: Subject to any disclaimer, the term of this patent is extended or adjusted under 35 U.S.C. 154(b) by 0 days.

(21) Appl. No.: 09/347,642

(22) Filed: Jul. 6, 1999

(30) Foreign Application Priority Data

Jul. 15, 1998 (EP) .............................................. 98810679

(51) Int. Cl.$^7$ ................................................ B24B 49/00
(52) U.S. Cl. ........................ 451/49; 451/142; 451/398
(58) Field of Search ............................ 451/49, 142, 243, 451/365, 374, 379, 398, 402

(56) References Cited

U.S. PATENT DOCUMENTS

| | | | |
|---|---|---|---|
| 2,693,631 A | | 11/1954 | Redman |
| 3,855,734 A | * | 12/1974 | Fournier .................. 451/243 X |
| 4,337,599 A | * | 7/1982 | Koide et al. .................... 451/49 |
| 4,766,700 A | * | 8/1988 | Kramberg et al. ......... 451/49 X |
| 5,525,092 A | * | 6/1996 | Hirano et al. .............. 451/49 X |
| 5,766,059 A | * | 6/1998 | Imai et al. ..................... 451/49 |

FOREIGN PATENT DOCUMENTS

| | | |
|---|---|---|
| CH | 340426 | 9/1959 |
| CH | 663374 | 12/1987 |
| EP | 0782898 | 7/1997 |
| GB | 1109277 | 4/1968 |

OTHER PUBLICATIONS

Copy of Claim 1 as Abstract for Swiss Patent No. 340,426.

* cited by examiner

Primary Examiner—Timothy V. Eley
Assistant Examiner—Anthony Ojini
(74) Attorney, Agent, or Firm—Ostrolenk, Faber, Gerb & Soffen, LLP

(57) ABSTRACT

The driving device for a circular grinding machine where the workpiece is driven between two stationary centers comprises a driven device allowing a removable attachment of a driver which is adapted to hold and turn the workpiece by means of elastic force. The driver comprises two adjacent, symmetrically disposed annular spring elements whose junction is provided with a through-going opening which forms two prismatic workpiece holders, as well as respective longitudinal openings disposed in the axis of the points of the prismatic workpiece holders which are provided with prismatic ends for receiving respective, correspondingly shaped bolts of the driven device of the circular grinding machine in order to spread apart the spring elements. A driver of this kind offers a reduced weight, on one hand, and a high precision, on the other hand, and it is particularly adapted for grinding small precision parts.

22 Claims, 2 Drawing Sheets

WORKPIECE HOLDER FOR A MACHINE TOOL

FIELD OF THE INVENTION

The present invention relates to a workpiece holder for a machine tool, more particularly a circular grinding machine or a lathe, of the type where the workpiece is rotated between two stationary centers. The workpiece holder is removeably attached to a driver which rotates the workpiece holder and with it the workpiece. The workpiece holder is adapted to hold the workpiece by means of elastic force, and drives the workpiece for rotation when the workpiece holder is driven by the driver. The workpiece holder comprises two adjacent, symmetrically disposed annular spring elements whose junction is provided with a throughgoing opening which forms two prismatic workpiece clamps.

BACKGROUND OF THE INVENTION

A workpiece holder of this kind is known from Swiss Patent No. 663,374, according to which introduction of the workpiece in the workpiece holder and its release from the workpiece holder are effected through pressure applied to the spring elements to drive the prismatic workpiece clamps apart. An actuation by external pressure leads to a relatively large external dimensions of the workpiece holder device and furthermore, the release and clamping movements are not precisely defined. This leads to a restriction of the field of application, in particular in the direction of small work pieces.

Another workpiece holder is known from European Patent Application No. 782,898, according to which the clamping chuck of a lathe acts upon radially moving clamping springs which actuate centering points in order to chuck the workpiece. The same drawbacks as explained above apply here.

The manufacture of small high-precision parts, e.g. injection needles for the automobile industry, makes high demands on the workpiece holder while the workpiece is held between two stationary centers. Due to the small dimensions of such small precision parts, on one hand, and their low inherent flexural stability, on the other hand, the precision geometrical requirements and the process safety of the grinding operation cannot be ensured by conventional workpiece holders such as heart shaped holders, driving centers and the like.

The essential drawbacks of the conventional workpiece holders of the prior art are deformations of the workpiece by the clamping force of the workpiece holder acting upon the workpiece;

a large rotating mass of the workpiece holder with respect to the stability of the workpiece;

the force transmission from the machine to the workpiece holder produces an excessive transversal force with respect to the stability of the workpiece, and the geometrical dimensions limit the workable length of the workpiece.

In the future, the developments in fuel injection technology will lead to even smaller workpiece dimensions and higher precision requirements, and thus to an even greater significance of the workpiece holder.

Although according to the first cited document, the mass of the workpiece holder is reduced in view of the then known prior art, it becomes increasingly difficult to reduce the size of the chucking of the parts.

SUMMARY OF THE INVENTION

It is an object of the present invention to provide a workpiece holder for machine tools which eliminates the above-described drawbacks while consistently separating the finctions of clamping the workpiece and that of transmitting the torque of the machine to the workpiece, eliminating as much as possible the lateral forces, and which offers a small rotating mass of the workpiece holder and a safe handling even of small parts. This object is attained by a workpiece holder which comprises respective longitudinal openings which are disposed along the axis of the points of said prismatic workpiece clamps and provided with prismatic ends for receiving respective, correspondingly shaped bolts of the drive of the circular grinding machine in order to spread apart the spring elements.

Further advantages and developments of the invention are defined in the dependent claims.

BRIEF DESCRIPTION OF THE DRAWINGS

The invention will be explained in more detail hereinafter with reference to a drawing of exemplary embodiments.

DETAILED DESCRIPTION OF THE INVENTION

Workpiece holder 1 essentially consists of two annular spring elements 2 and 3 which are disposed next to each other in a single plane and symmetrically with respect to symmetrical axis S, and whose junction comprises a through opening 4 which is defined by two prismatic workpiece clamps 5.

Figure 1:
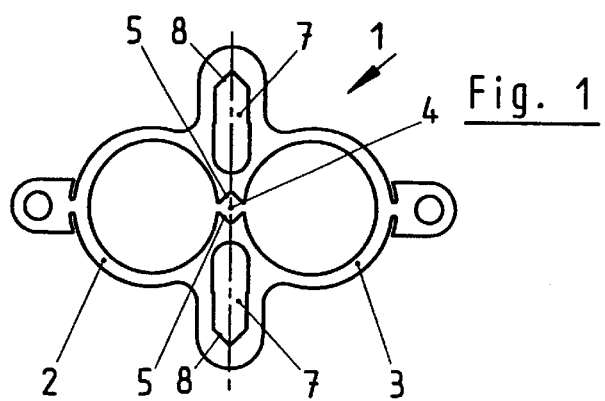
FIG. 1 shows a top view of the workpiece holder of the driving device of the invention.
Figure 2:
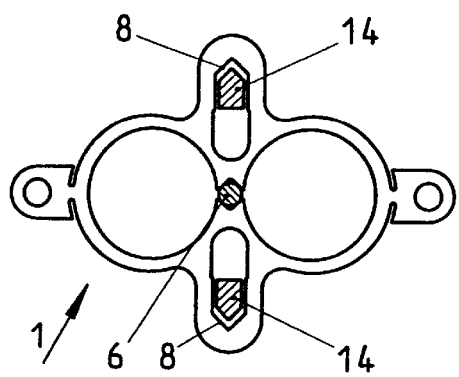
FIG. 2 shows the workpiece holder while clamped on the workpiece.

As shown in FIG. 2, the tension acting upon workpiece 6 is produced by the elastic force of the two annular spring elements 2 and 3 exclusively. The tension force depends on the dimensions (i.e. on the diameter, the thickness and the shape) of the workpiece holder, and on the material of the workpiece holder. In the present case, spring steel is used. The dimensions of the prismatic workpiece clamps 5 receiving the workpiece depend on the diameter of the particular workpiece being machined.

Figure 4:
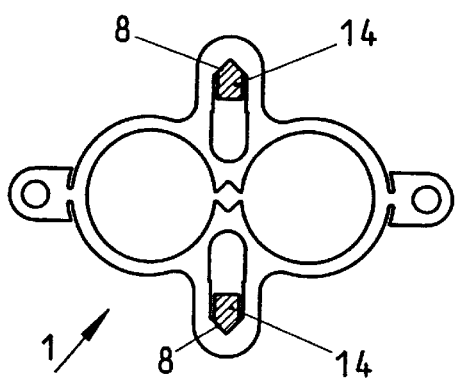
FIGS. 4 and 5 show the workpiece holder and the circular grinding machine in the open position.

As shown in FIG. 2, two elongate openings 7, each having a prismatic outer end 8 for the reception of correspondingly shaped, prismatic bolts 14 of the opening mechanism of the circular grinding machine, are formed in the workpiece holder 1 along the axis of symmetry S. When the bolts are spread apart, the spring is also spread apart enlarging the opening 4 located between the two prismatic workpiece clamps 5, see FIG. 4, thereby allowing insertion or removal of the workpiece 6.

Figure 3:
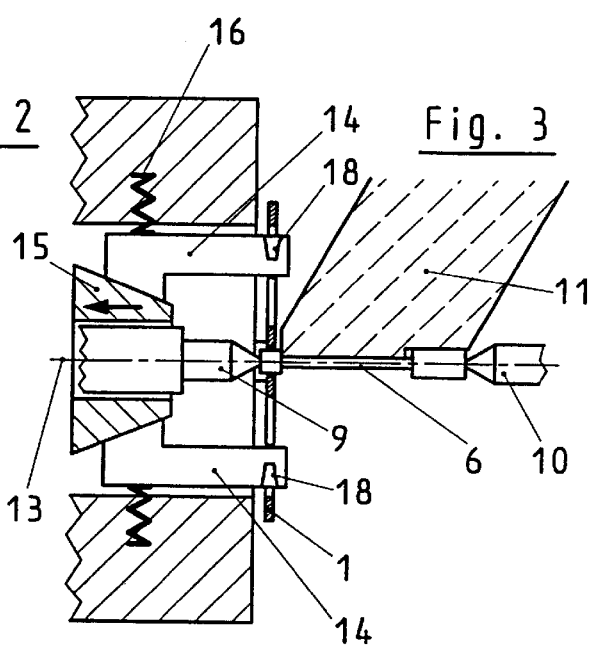
FIG. 3 shows a schematic cross-sectional view of the workpiece holder with the workpiece during machining.

In FIG. 3, the part of the circular grinding machine which is relevant for the invention is shown schematically, as well as workpiece 6, e.g. an injection needle for fuel injection, which is supported between two stationary centers 9 and 10 and being machined by a grinding tool 11. Workpiece holder 1 is driven by the drive of the circular grinding machine through one of the two bolts 14 of opening mechanism 13.

Figure 5:
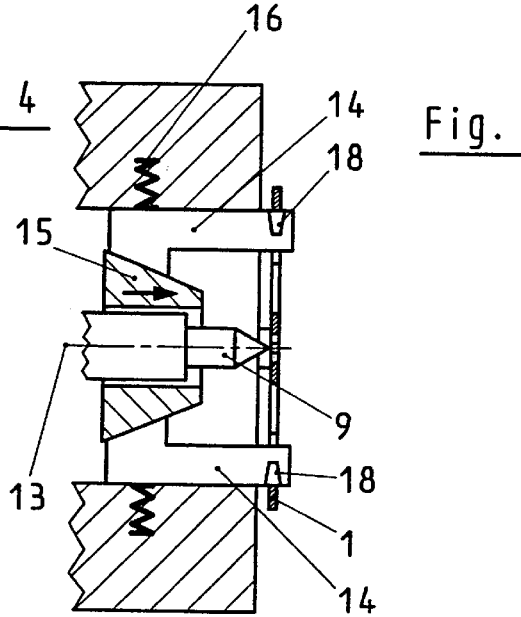
Figure 6:
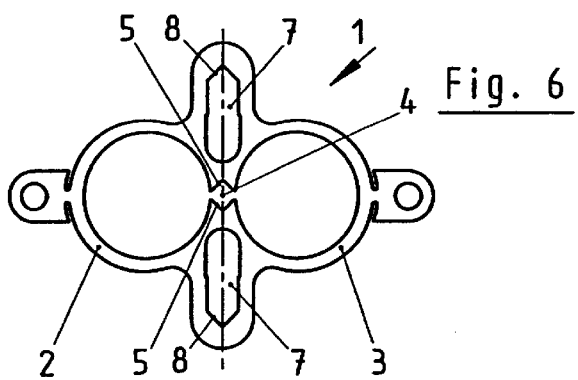
FIGS. 6–10 show an alternative embodiment of FIGS. 1–5 where the workpiece holder is mounted on a driver plate.
Figure 7:
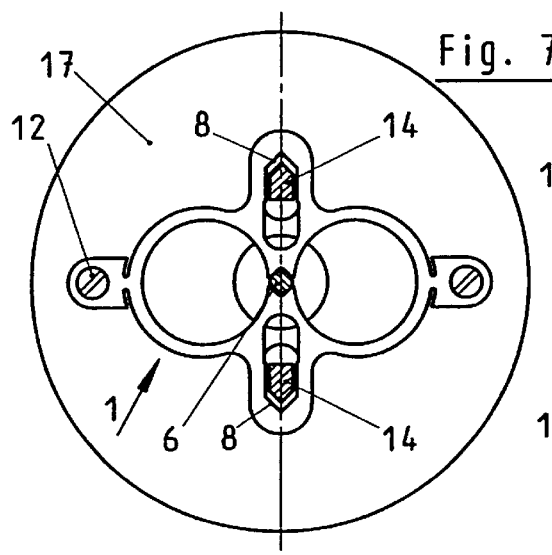
Figure 8:
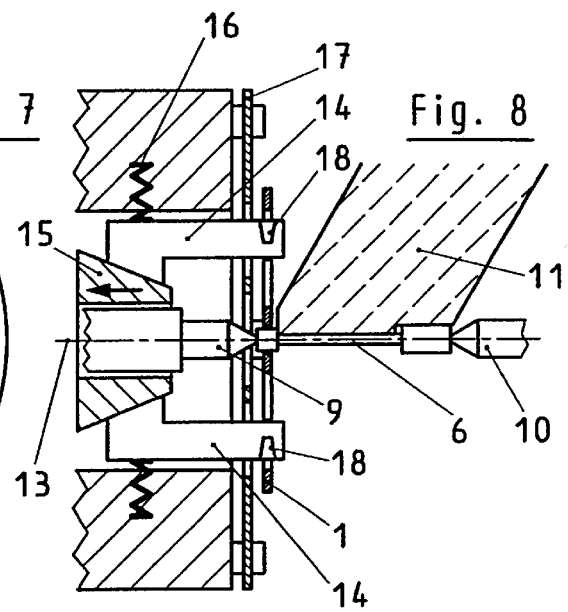
Figure 9:
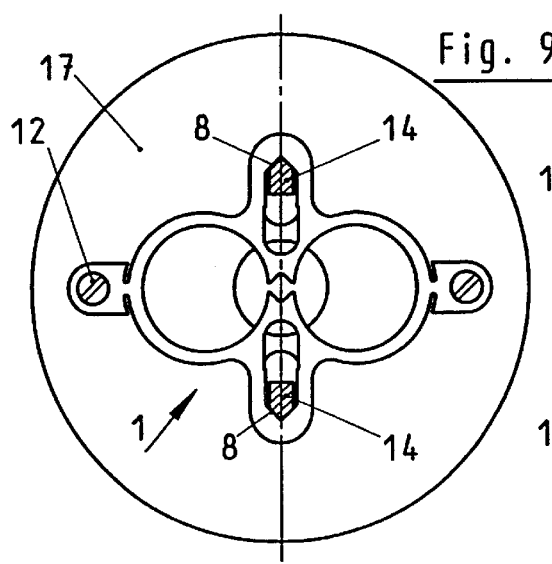
Figure 10:
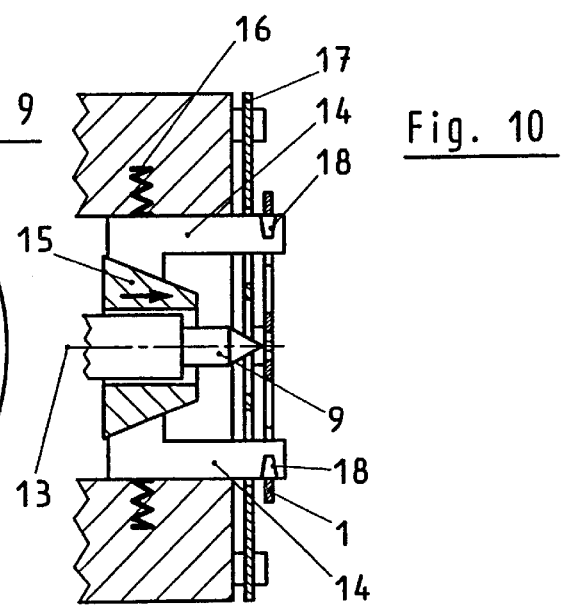

The opening mechanism comprises two bolts 14 which are radially adjustable up to a rigid stop and which are actuated by a displaceable cone 15 which in the position shown in FIG. 3 is withdrawn in such a manner that the bolts are moved radially inwardly under the action of a spring 16 and in a position in which they do not exert any force on the workpiece holder 1, whereas in the position shown in FIG. 5, the displaceable cone 15 is pushed in (to the right in FIG. 5), thereby spreading apart the two bolts 14 against the force of springs 16 and thus spreading apart the workpiece holder 1, so that its prismatic workpiece clamps are spread apart and the work piece 6 can be inserted into or removed from the workpiece holder 1. For a safe guidance of the workpiece holder 1, the prismatic ends of the bolts are provided with notches 18.

In the embodiment according to FIGS. 6–10, workpiece holder 1 is fastened to a driver plate 17 by means of screws 12, and the driver plate 17 is fastened to the circular grinding machine. Driver plates of this kind have been manufactured and used for years, and they are so designed that a floating and play-free connection is ensured. By a suitable shape of the connecting elements of the driver plate, a torsionally rigid but radially and axially resilient connection to the workpiece holder is established which transmits the driving torque of the machine to the workpiece holder substantially free of lateral forces. By joining a plurality of driver plates, the torsional rigidity may be adapted to the requirements.

It follows from the description that due to the precise configuration both of the prismatic workpiece clamps 5 receiving the workpiece 6 and of the prismatic ends 8 formed in the openings 7, the central axis of both prismatic workpiece clamps 5 receiving the workpiece 6 coincides with the axis of the centers 10 and that it is possible to guide the workpiece holder 1 in a direction perpendicular to the workpiece axis. The entire workpiece holder 1 is disposed in a single plane, so that no torsion or bending moment is transmitted to the workpiece 6.

The clamping force on the workpiece 6 is determined by the dimensions and the material of the workpiece holder 1 exclusively, so that the clamping force can easily be adapted to the respective requirements by a corresponding modification of the material thickness without the need of varying any other properties. For transmitting high specific forces it is advantageous to choose for the prismatic workpiece clamps 5 a material with a high retaining, resp. frictional force. It is also possible to use an appropriate coating on the parts in contact with the work piece.

As described above, the prismatic work piece clamps of the present example is made of spring steel, but different materials can also be used. Moreover, the annular spring elements of the present embodiments have a circular configuration, but it is also possible to use spring elements of another design, e.g. triangular or polygonal annular spring elements whose junction comprises the mentioned throughgoing opening with the prismatic workpiece holders. Instead of the prismatic workpiece clamps, in certain applications, a differently designed contact zone maybe considered, e.g. a form-fit or several contact points, e.g. three.

The invention has been explained with reference to a circular grinding machine, but the driving device of the invention can also be used for other machine tools such as precision lathes or turning machines.

Modern computing methods allow a simple optimization of the shape in the sense of a compromise between static and dynamic requirements as well as a limitation of the material fatigue by workpiece change.

What is claimed is:

1. A driving device for a machine tool which rotatably holds a workpiece between two stationary centers for rotation about a rotational axis, said driving device comprising:

a workpiece holder including two adjacent, symmetrically disposed annular spring elements which join at a through opening defined by two prismatic workpiece clamps for holding a workpiece along said rotational axis, each of said prismatic workpiece clamps having a pair of sides merging at a respective point, said workpiece holder also having a pair of longitudinal openings disposed along an axis of said points, each of said longitudinal openings having a respective prismatic end; and a driver for applying a rotational force to said workpiece holder, said driver having a pair of bolts which extend into respective ones of said longitudinal openings of said workpiece holder, each bolt having an end whose shape corresponds to said prismatic end of said its respective longitudinal openings for spreading apart said through opening when said bolts are moved radially outward.

2. The driving device of claim 1, wherein said annular spring elements have a circular geometric configuration.

3. The driving device of claim 1, wherein said two bolts are moved radially outward by means of a displaceable cone.

4. The driving device of claim 1, wherein said workpiece holder is fastened to a driver plate.

5. The driving device of claim 1, wherein a surface of each of said prismatic workpiece clamps comprises a material with high retaining force.

6. A use of said driving device of claim 1, wherein said workpiece holder is clamped onto said workpiece outside a working area of said machine tool and subsequently charged and discharged along with said workpiece.

7. The driving device of claim 1, wherein said annular spring elements have a triangular geometric configuration.

8. The driving device of claim 1, wherein said annular spring elements have a polygonal geometric configuration.

9. The driving device of claim 1, wherein said workpiece holder is planar in shape.

10. A driving device for a machine tool which rotatably holds a workpiece between two stationary centers for rotation about a rotational axis, said driving device comprising:

a planar workpiece holder including two adjacent, symmetrically disposed annular spring elements which join at a through opening defined by two prismatic workpiece clamps for holding a workpiece along said rotational axis, said workpiece clamps being radially moveable along a clamping axis which extends perpendicular to said rotational axis, said workpiece holder having a pair of longitudinal openings disposed along said clamping axis on opposite sides of said through opening;

a driver for applying a rotational force to said workpiece holder; and a pair of bolts extending into respective ones of said longitudinal openings of said workpiece holder for spreading apart said clamps when said bolts are moved radially outward.

11. The driving device of claim 10, wherein said annular spring elements are circular in shape.

12. The driving device of claim 10, wherein said annular spring elements are triangular in shape.

13. The driving device of claim 10, wherein said annular spring elements are polygonal in shape.

14. The driving device of claim 10, wherein said workpiece clamps are v-shaped.

15. The driving device of claim 14, wherein a line extending through an apex of said v-shaped workpiece clamps extends along said clamping axis.

16. The driving device of claim 15, wherein said bolts have v-shaped surfaces which engage the v-shaped workpiece clamps.

17. The driving device of claim 10, wherein said bolts are moved radially outward by a displaceable cone.

18. The driving device of claim 17, wherein said cone is displaceable along said rotational axis.

19. The driving device of claim 18, wherein said bolts are biased radially inward by at least one spring.

20. The driving device of claim 19, wherein said bolts are moved radially outward against the spring force of said at least one spring when said cone is moved axially along said rotational axis.

21. The driving device of claim 10, wherein said workpiece holder is coupled to a driver plate and said driver plate is rotated by said driver.

22. The driving device of claim 10, wherein a surface of each of said workpiece clamps comprises a material having a high coefficient of friction.

* * * * *